United States Patent
Caputo et al.

(10) Patent No.: US 10,150,837 B2
(45) Date of Patent: Dec. 11, 2018

(54) PROCESSES FOR REMOVING WATER FROM A POLYETHER POLYOL

(71) Applicant: Covestro LLC, Pittsburgh, PA (US)

(72) Inventors: Jenna L. Caputo, Bridgeville, PA (US); Matthew S. Otto, Bridgeport, OH (US); Mark A. Christman, II, Woodsfield, OH (US); Daniel R. Wagner, Pittsburgh, PA (US)

(73) Assignee: COVESTRO LLC, Pittsburgh, PA (US)

( * ) Notice: Subject to any disclaimer, the term of this patent is extended or adjusted under 35 U.S.C. 154(b) by 279 days.

(21) Appl. No.: 15/190,841

(22) Filed: Jun. 23, 2016

(65) Prior Publication Data
US 2017/0369647 A1 Dec. 28, 2017

(51) Int. Cl.
*C08G 65/30* (2006.01)
*B01D 3/14* (2006.01)
*B01D 3/42* (2006.01)

(52) U.S. Cl.
CPC .............. *C08G 65/30* (2013.01); *B01D 3/14* (2013.01); *B01D 3/42* (2013.01)

(58) Field of Classification Search
CPC .............. B01D 3/14; B01D 3/42; C08G 65/30
See application file for complete search history.

(56) References Cited

U.S. PATENT DOCUMENTS

| | | |
|---|---|---|
| 3,016,404 A | 1/1962 | Beauchamp et al. |
| 3,729,387 A | 4/1973 | Naschke et al. |
| 4,306,943 A | 12/1981 | Mori et al. |
| 4,430,490 A | 2/1984 | Doerge |
| 4,985,551 A | 1/1991 | Perry et al. |
| 5,053,111 A * | 10/1991 | Ellerbe, Jr. .............. B01D 3/02 137/391 |
| 5,371,119 A | 12/1994 | Bohlander et al. |
| 5,449,841 A | 9/1995 | Goegebeur |
| 5,925,687 A | 7/1999 | Guettes et al. |
| 6,376,625 B1 | 4/2002 | Cosman et al. |
| 2004/0073069 A1 | 4/2004 | Heider et al. |
| 2015/0133696 A1* | 5/2015 | Den Heeten ............ C08G 65/30 568/621 |
| 2016/0369051 A1 | 12/2016 | Lorenz et al. |

FOREIGN PATENT DOCUMENTS

| | | | |
|---|---|---|---|
| CA | 2165140 A1 | 7/1996 | |
| CN | 103466549 A * | 12/2013 | .............. C01B 7/07 |
| DE | 19838156 A1 | 2/2000 | |
| EP | 0050181 A1 | 4/1982 | |
| JP | A1995251002 * | 3/1995 | .............. B01D 3/10 |
| JP | 5550549 B2 * | 7/2014 | ......... C08G 18/4841 |
| WO | 01/88015 A1 | 11/2001 | |
| WO | 2010/145899 A1 | 12/2010 | |

(Continued)

OTHER PUBLICATIONS

CN 103466549A_ENG (Espacenet translation of Yang) (Year: 2013).*

(Continued)

*Primary Examiner* — Renee Robinson
*Assistant Examiner* — Gabriel E Gitman
(74) *Attorney, Agent, or Firm* — Donald R. Palladino

(57) ABSTRACT

Disclosed are processes and systems for removing water from a polyether polyol that employs a controlled temperature and pressure profile.

21 Claims, 11 Drawing Sheets

(56) References Cited

FOREIGN PATENT DOCUMENTS

WO      2013/013028 A1    1/2013
WO      WO2015091471 A1 *   6/2015   ............. C08G 65/10

OTHER PUBLICATIONS

JP5550549B2_ENG (Espacenet translation of Miyata) (Year: 2014).*
JPA1995251002_ENG (JPO translation of Hodozuka) (Year: 1995).*
WO2015091471A1_ENG (Espacenet translation of Lorenz) (Year: 2015).*
WO2015091471A1_ENG (Espacenet machinen translation of Lorenz) (Year: 2015).*

* cited by examiner

PROCESSES FOR REMOVING WATER FROM A POLYETHER POLYOL

FIELD

The present invention is directed to, among other things, processes and systems for removing water from polyether polyols.

BACKGROUND

Polyether polyols are often manufactured commercially using a catalyzed reaction of initiators having active hydrogen atoms with epoxides such as, for example, ethylene oxide and/or propylene oxide. Alkalinity is introduced into the polyether polyols, for example, by using alkaline metal hydroxides as catalysts.

Potassium hydroxide (KOH) and sodium hydroxide (NaOH) are some examples of typical alkaline catalysts used. In general, the metal hydroxide catalyst is added to the starter (usually a hydroxyl group containing compound), and equilibrium between the metal hydroxide and the starter occurs. This equilibrium is as shown in the following equation (using KOH as the alkaline catalyst):

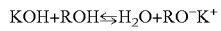

Both the hydroxide and the alkoxide can react with epoxides. This is often acceptable for short chain (low molecular weight) polyols, but the reaction of water is undesirable in the preparation of higher molecular weight (i.e., number average molecular weight of at least 1000) ethylene oxide capped polyols. It is therefore, necessary to force the above equilibrium to the right by removing the water (i.e., dewatering). This converts all of the hydroxide to alkoxide. The total amount of alkalinity remains constant and is equal to the amount of KOH originally added.

Once the polymerization of the epoxide(s) is completed, the alkaline catalyst is typically neutralized and removed from the crude mixture to yield the final polyether polyol. Several processes for the removal of the residual catalysts from the crude polyether polyols to yield the final product are known.

For example, in some cases, the polyether polyol undergoes a batch distillation after being neutralized. This distillation can occur at various temperatures and pressures. Moreover, during the distillation, some polyols, such as long chain active polyols, form a foam layer on top of the liquid product that rises up, and, if it rises high enough, it can overflow into the vessel's vent line, which can result in wastewater contamination and/or the need for manual cleaning of downstream equipment. As a result, in some cases, it may be necessary to decrease product batch sizes in order to minimize the occurrence of such "foam over", which hinders productivity.

As a result, it would be desirable to provide a process for removing water from a polyether polyol in a vessel by batch distillation that can significantly reduce the frequency of foam-over and, in some cases, may even allow for the batch sizes to be increased in order to utilize more of the reactor capacity.

The present invention was made in view of the foregoing.

SUMMARY OF THE INVENTION

In certain respects, the present invention is directed to processes for removing water from a polyether polyol in a vessel by batch distillation. These processes comprise: (a) heating the polyether polyol to a temperature within a first predetermined distillation temperature range while (i) maintaining the pressure of the vessel at or above normal atmospheric pressure and at or below a predetermined maximum pressure, and (ii) controlling the rate of increase in vessel pressure within a predetermined pressure increase rate range, to remove a first portion of the water from the polyether polyol; and then (b) controlling the rate of decrease in vessel pressure within a predetermined pressure decrease rate range, to remove a second portion of the water from the polyether polyol.

In other respects, the present invention is directed to processes for removing water from a polyether polyol in a vessel by batch distillation that comprises: (a) heating the polyether polyol to a temperature within a first predetermined distillation temperature range while (i) maintaining the pressure of the vessel at or above normal atmospheric pressure and at or below a predetermined maximum pressure, and (ii) controlling the rate of increase in vessel pressure within a predetermined pressure increase rate range, to remove a first portion of the water from the polyether polyol; then (b) controlling the rate of decrease in vessel pressure to normal atmospheric pressure within a first predetermined pressure decrease rate range; and then (c) maintaining the temperature of the polyether polyol within a second predetermined distillation temperature range while (i) maintaining the pressure of the vessel below normal atmospheric pressure, and (ii) controlling the rate of decrease in vessel pressure within a second predetermined pressure decrease rate range, which may be the same as or different from the first predetermined pressure decrease range.

The present invention is also directed to, among other things, polyether polyols produced by such processes as well as their use in the manufacture of polyurethanes.

DETAILED DESCRIPTION

Figure 1:
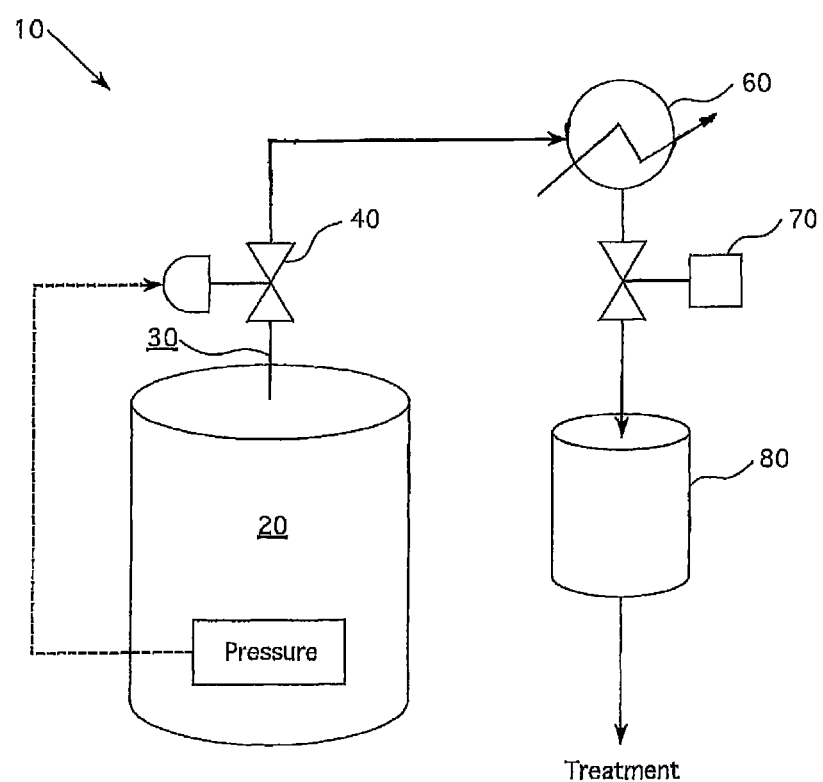
FIG. 1 is a schematic illustration of an embodiment of a system suitable for carrying out processes of the present invention.

Various embodiments are described and illustrated in this specification to provide an overall understanding of the structure, function, properties, and use of the disclosed inventions. It is understood that the various embodiments described and illustrated in this specification are non-limiting and non-exhaustive. Thus, the invention is not limited by the description of the various non-limiting and non-exhaustive embodiments disclosed in this specification. The features and characteristics described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant(s) reserve the right to amend the claims to affirmatively disclaim features or characteristics that may be present in the prior art. Therefore, any such amendments comply with the requirements of 35 U.S.C. § 112 and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant(s) reserves the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant(s) reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112 and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

As indicated, in certain embodiments, the present invention is directed to processes for removing water from a polyether polyol in a vessel by batch distillation. The polyether polyols subject to the processes of the present invention can be prepared, for example, by a procedure in which one or more alkylene oxides having from 2 to 10 carbon atoms in the alkylene radical, such as 2 to 6 carbon atoms in the alkylene radical, and which are optionally substituted, are added to a starter molecule that contains at least 2, such as 2 to 8, or, in some cases, 2 to 4 active hydrogen atoms, in the presence of an alkaline catalyst. The processes of the present invention are suitable for removing water from a wide range of polyether polyols, in terms of their functionality, molecular weight and OH number. In certain embodiments, however, the processes of the present invention are particularly advantageous for use in connection with removing water from a polyether polyol that has a number average molecular weight of at least 700 gram/mole, such as 700 gram/mole to 12,000 gram/mole, or, in some cases, 1000 to 12,000 gram/mole, and a hydroxyl number of 28 to 150 mg KOH/gram determined according to ASTM D6342-12. The number average molecular weights of the polyols described herein are calculated from the polyol's functionality and hydroxyl number according to the equation:

$$M_n = \frac{56100 * f}{OH\#}$$

in which $f$ is the functionality of the compound (i.e., the number of hydroxyl groups per molecule), OH# is the hydroxyl number of the polyol and is equal to the mass in milligrams of potassium hydroxide (56.1 grams/mol) equivalent to the hydroxyl content in one gram of the polyol compound (mg KOH/g), and $M_n$ is the number average molecular weight of the polyol.

Suitable alkylene oxides for preparing such polyether polyols include, but are not limited to, butylene oxide, styrene oxide, ethylene oxide and propylene oxide. The alkylene oxides may be used individually, sequentially or as mixtures of two or more thereof. In certain embodiments, however, the processes of the present invention are particularly advantageous for use in connection with removing water from an "active" polyether polyol, which, as used herein, refers to an ethylene oxide capped polyether polyol having terminal primary hydroxyl groups.

Suitable starter molecules for preparing such polyether polyols include, but are not limited to, aliphatic and aromatic N-mono-, N,N- and N,N'-dialkyl substituted diamines with 1 to 4 carbon atoms in the alkyl radical such as mono- and dialkyl substituted ethylenediamine, diethylenetriamine, triethylene-tetramine, 1,5-pentanediamine, 1,3-propylenediamine, 1,3- and/or 1,4-butylenediamine, 1,2-, 1,3-, 1,4-, 1,5- and 1,6-hexamethylenediamine, phenylenediamine, 2,4- and 2,6-toluenediamine, 4,4'-, 2,4- and 2,2'-diaminodiphenylmethane and mixtures of diaminodiphenylmethanes, etc.

Other suitable starter molecules include alkanolamines, such as ethanolamine, diethanolamine, N-methyl- and N-ethyl alkanolamines, such as N-methyl- and N-ethyl-diethanolamine and triethanolamine, and ammonia, among others. In some embodiments, the starter molecules include monofunctional compounds such as, for example, butyl carbitol, and multifunctional, particularly bi- and/or trifunctional compounds, such as, for example, water, ethylene glycol, 1,2-propylene glycol and trimethylene glycol, diethylene glycol, dipropylene glycol, 1,4-butanediol, 1,6-hexamethylene glycol, glycerine, trimethylol-propane, pentaerythritol, sorbitol and sucrose. The starter molecules may be used individually or as mixtures.

An alkaline catalyst is used in the preparation of the polyether polyol that is subject to the processes of the present invention. Examples of such catalysts are alkali alkoxides with 1 to 4 carbon atoms in the alkyl radical, such as, but not limited to, sodium methylate, sodium and potassium ethylate, potassium isopropylate and sodium butylate, and alkali hydroxides, such as sodium hydroxide, potassium hydroxide and cesium hydroxide. Such catalysts may be used individually or as mixtures of two or more thereof. In certain embodiments, the catalyst is used in an amount of 0.01 to 5 weight percent, 0.2 to 3 weight percent, or, in some cases, 0.1 to 1.0 weight percent, based on the overall weight of the total reactant charge.

In some embodiments of the processes of the present invention, the alkaline catalyst is neutralized in the presence of water. In certain embodiments of the processes of the present invention, prior to any distillation, water is present in an amount of 1% to 15% by weight, such as 3% to 13% by weight, or, in some cases, 4% to 10% by weight or 4% to 8% by weight, based on the total weight of polyether polyol present.

In certain embodiments, the alkaline catalyst is neutralized with an acid. Examples of suitable acids include, but are not limited to, sulfuric acid, phosphoric acid, carbonic acid, tartaric acid, lactic acid, acetic acid, citric acid, and DDBSA (dodecylbenzene sulfonic acid). The amount of acid employed is, in certain embodiments, from 0.3 to 1.5 equivalents of acid per equivalent of alkaline catalyst, such as 0.9 to 1.2 equivalent of acid per equivalent of alkaline catalyst, or, in some cases, 1.0 to 1.1 equivalent of acid per equivalent of alkaline catalyst.

It is also possible to use an adsorbent to neutralize the alkaline polymerizate instead of or in addition to the acid neutralization. Adsorbents are also effective in removing alkaline and any excess acid present in the crude polyether polyol. Examples of acid-adsorbents include oxides, carbonates, hydroxides and silicates of Ca, Mg, Al and their complexes such as $MgCO_3$, $CaCO_3$, $0.5MgO.Al_3.xH_2O$, $Mg_6Al_2(OH)_{16}CO_3.4H_2O$, synthetic magnesium silicate, calcium silicate and synthetic aluminum silicate. Examples of alkali-adsorbents include synthetic magnesium silicate, synthetic aluminum silicate, activated bentonite, acid bentonite and their mixtures.

The processes of the present invention will now be described with reference to FIG. 1, which is a schematic illustration of a system 10 suitable for carrying out the processes of the present invention. FIG. 1 illustrates a neutralizer vessel 20. In certain embodiments, prior to commencing the processes of the present invention, the neutralizer vessel 20 contains a polyether polyol, a neutralized alkaline catalyst, and water present in an amount described above. As shown in FIG. 1, in the depicted system, neutralizer vessel 20, which typically comprises an agitator, such as a gate agitator and/or a turbine agitator, has a vent line 30 attached to the top of the neutralizer vessel 20. A vent control valve 40 is disposed in the vent line 30 upstream of further equipment, such as condenser 60, distillate flow control valve 70, and distillate receiver 80. In certain embodiments of the invention, the vent control valve 40 is a ball valve.

As described earlier, the processes of the present invention are directed to removing water from a polyether polyol in a vessel by batch distillation. As used herein, "batch distillation" means that a mixture comprising a polyether polyol, water, and neutralized alkaline catalyst is distilled to separate the water from the polyether polyol before the vessel is again charged with more of such a mixture and the process then repeated. Batch distillation is in contrast with continuous distillation where the mixture is added and the distillate drawn off without interruption.

The processes of the present invention comprise heating the polyether polyol to a temperature within a first predetermined distillation temperature range. As used herein, the term "first predetermined distillation temperature range" means a target distillation temperature range for step (a) of the processes of the present invention that is determined at or before commencing the heating of the polyether polyol. In certain embodiments of the present invention, the first predetermined distillation temperature range is at least 100° C., such as 100° C. to 140° C., or in some cases 100° C. to 120° C. or, in yet other cases, 110° C. to 120° C.

In the processes of the present invention, the pressure of the vessel is maintained at or above normal atmospheric pressure and at or below a predetermined maximum pressure while the foregoing heating of the polyether polyol takes place. As used herein, "normal atmospheric pressure" means 1 atmosphere (14.7 $lb/in^2$). As used herein, the term "predetermined maximum pressure" means a target maximum vessel pressure during step (a) of the processes of the present invention that is determined at or before commencing the heating of the polyether polyol. In certain embodiments of the present invention, the predetermined maximum pressure is at least normal atmospheric pressure up to 2.02 atmosphere (29.7 $lb/in^2$), such as up to 1.68 atmosphere (24.7 $lb/in^2$), or in some cases, up to 1.54 atmosphere (22.7 $lb/in^2$).

In addition, in the processes of the present invention, the rate of increase in vessel pressure is controlled within a predetermined pressure increase rate range while the foregoing heating of the polyether polyol takes place. In certain embodiments of the present invention, this rate of pressure increase is controlled by adjusting the position of vent control valve 40, in some cases solely by adjusting the position of vent control valve 40. For example, in some embodiments of the present invention, the rate of pressure increase is not controlled by other means, such as by injecting an inert gas stream, such as nitrogen gas, into the vessel to adjust the rate of vessel pressure increase. In these embodiments, the position of the vent control valve 40 is such that the vent control valve 40 will open to a greater extent when necessary to allow release of vapor from the vessel 20 at times when the vessel pressure exceeds any instantaneous pressure set point. In certain embodiments, the target (set point) rate of increase in vessel pressure during step (a) of the processes of the present invention is a rate within the range of 0.01 to 1 $lb/in^2$ per minute (0.00068 to 0.068 atmosphere per minute), such as 0.1 to 0.5 $lb/in^2$ per minute (0.0068 to 0.034 atmosphere per minute), or, in some cases 0.1 to 0.3 $lb/in^2$ per minute (0.0068 to 0.020 atmosphere per minute). In certain embodiments, a single target rate of increase in vessel pressure during step (a) is employed, whereas, in other embodiments, a plurality of different rates of increase in vessel pressure during step (a) of the processes of the present invention is employed.

As indicated, step (a) of the processes of the present invention removes a first portion of the water from the polyether polyol. In certain embodiments, at least 50% by weight, in some cases, at least 70% by weight, at least 80% by weight, or, in yet other cases at least 90% by weight of the water in the polyether polyol is removed during step (a). In the processes of the present invention, as will be appreciated, less than 100% by weight of the water in the polyether polyol is removed during step (a).

In the processes of the present invention, the rate of decrease in vessel pressure is controlled within a predetermined pressure decrease rate range, to remove a second portion of the water from the polyether polyol.

In certain embodiments of the processes of the present invention, upon reaching a temperature within the first predetermined distillation temperature range, the vessel pressure is first decreased to normal atmospheric pressure. More particularly, in certain embodiments, the rate of decrease in vessel pressure to normal atmospheric pressure is controlled. In certain embodiments of the present invention, this rate of pressure decrease to normal atmospheric pressure is controlled by adjusting the position of vent control valve 40, in some cases solely by adjusting the position of vent control valve 40. In these embodiments, the position of the vent control valve 40 is such that the vent control valve 40 will open to a greater extent when necessary to allow release of vapor from the vessel 20 at times when the vessel pressure exceeds any instantaneous pressure set point. In certain embodiments, the target (set point) rate of decrease in vessel pressure to normal atmospheric pressure is a rate within the range of 0.01 to 1 lb/in$^2$ per minute (0.00068 to 0.068 atmosphere per minute), such as 0.1 to 0.5 lb/in$^2$ per minute (0.0068 to 0.034 atmosphere per minute), or, in some cases 0.1 to 0.3 lb/in$^2$ per minute (0.0068 to 0.020 atmosphere per minute).

Moreover, in certain embodiments of the present invention, a plurality, such as 3 or more, different target rates of decrease in vessel pressure to normal atmospheric pressure are employed. For example, in some embodiments, (a) the target rate of decrease in vessel pressure to normal atmospheric pressure is "x", wherein "x" is, in some embodiments, a value within the range of 0.1 to 0.3 lb/in$^2$ per minute (0.0068 to 0.020 atmosphere per minute) to a first pressure set point above normal atmospheric pressure, (b) the target rate of rate of decrease in vessel pressure to normal atmospheric pressure is less than "x", such as less than 50% of "x", such as 0.01 to less than 0.1 lb/in$^2$ per minute (0.00068 to less than 0.068 atmosphere per minute) or, in some cases, 0.02 to 0.08 1 lb/in$^2$ per minute (0.0014 to 0.0054 atmosphere per minute) to a second pressure set point that is a pressure lower than the first pressure set point above normal atmospheric pressure and above normal atmospheric pressure, and (c) the target rate of decrease in vessel pressure to normal atmospheric pressure is greater than "x", such as at least 120% of "x", such as 0.12 to 0.5 lb/in$^2$ per minute (0.0082 to 0.034 atmosphere per minute) or, in some cases, 0.15 to 0.4 lb/in$^2$ per minute (0.010 to 0.027 atmosphere per minute) to a third pressure set point that is a pressure lower than the second pressure set point above normal atmospheric pressure and at or above normal atmospheric pressure.

In some embodiments of the processes of the present invention, the temperature of the polyether polyol is then maintained at a temperature within a second predetermined distillation temperature range while (i) maintaining the pressure of the vessel below normal atmospheric pressure, and (ii) controlling the rate of decrease in vessel pressure below normal atmospheric pressure within a predetermined pressure decrease rate range, to remove a second portion of the water from the polyether polyol.

As used herein, the term "second predetermined distillation temperature range" means a target distillation temperature range for step (b) of the processes of the present invention that is determined at or before commencing the heating of the polyether polyol. In certain embodiments of the present invention, the second predetermined distillation temperature range is at least 110° C., such as 110° C. to 150° C., or in some cases 120° C. to 140° C., including 120° C. to 130° C. In certain embodiments of the present invention, the temperature of the polyether polyol within the second predetermined distillation temperature range is higher than the temperature of the polyether polyol within the first predetermined distillation temperature range, such as at least 2° C., at least 5° C., or in some cases, at least 10° C.

As indicated, in embodiments of the processes of the present invention, while the temperature of the polyether polyol is maintained at a temperature within the second predetermined distillation temperature range, vacuum is pulled on the vessel 10 such that the pressure of the vessel 10 is maintained below normal atmospheric pressure. Any suitable means may be employed to remove gas molecules from the vessel 10 to thereby leave behind a partial vacuum, such as, without limitation, a positive displacement pump, a momentum transfer pump, an entrapment pump, or a combination of any of these.

In embodiments of the processes of the present invention, the rate of decrease in vessel pressure below normal atmospheric pressure is controlled within a predetermined pressure decrease range. In certain embodiments of the present invention, this rate of pressure decrease below normal atmospheric pressure is controlled by adjusting the position of vent control valve 40, in some cases solely by adjusting the position of vent control valve 40. In these embodiments, the position of the vent control valve 40 is such that the vent control valve 40 will open to a greater extent when necessary to allow release of vapor from the vessel 20 at times when the vessel pressure exceeds any instantaneous pressure set point. In certain embodiments, the target (set point) rate of decrease in vessel pressure below normal atmospheric pressure is a rate within the range of 0.01 to 1 lb/in$^2$ per minute (0.00068 to 0.068 atmosphere per minute), such as 0.1 to 0.5 lb/in$^2$ per minute (0.0068 to 0.034 atmosphere per minute), or, in some cases 0.1 to 0.3 lb/in$^2$ per minute (0.0068 to 0.020 atmosphere per minute).

Moreover, in certain embodiments of the present invention, a plurality, such as 3 or more, different target rates of decrease in vessel pressure below normal atmospheric pressure are employed. For example, in some embodiments, (a) the target rate of decrease in vessel pressure below normal atmospheric pressure is "y", wherein "y" is, in some embodiments, a value within the range of 0.1 to 0.3 lb/in$^2$ per minute (0.0068 to 0.020 atmosphere per minute) to a first pressure set point below normal atmospheric pressure, (b) the target rate of decrease in vessel pressure below normal atmospheric pressure is greater than "y", such as at least 120% of "y", such as 0.12 to 0.5 lb/in$^2$ per minute (0.0082 to less than 0.034 atmosphere per minute) or, in some cases, 0.2 to 0.4 1 lb/in$^2$ per minute (0.0014 to 0.0027 atmosphere per minute) to a second pressure set point that is a pressure lower than the first pressure set point below normal atmospheric pressure, and (c) the target rate of decrease in vessel pressure below normal atmospheric pressure is less than "y", such as less than 80% of "y", such as 0.01 to less than 0.1 lb/in$^2$ per minute (0.00068 to less than 0.068 atmosphere per minute) or, in some cases, 0.02 to 0.08 1 lb/in$^2$ per minute (0.0014 to 0.0054 atmosphere per minute) to a third pressure set point that is a pressure lower than the second pressure set point below normal atmospheric pressure.

As indicated, step (b) of the processes of the present invention removes a second portion of the water from the polyether polyol. In certain embodiments, following step (b) of the process, the polyether polyol is dewatered. As used herein, "dewatered" means that the polyether polyol has a water content of no more than 10,000 ppm, such as no more than 1,000 ppm, or, in some cases, no more than 500 ppm (when measured according to ASTM D4672 (2012)).

As will be appreciated by the foregoing description, certain embodiments of the present invention are directed to processes for removing water from a polyether polyol in a vessel by batch distillation that comprise: (a) heating the polyether polyol to a temperature within a first predetermined distillation temperature range while (i) maintaining the pressure of the vessel at or above normal atmospheric pressure and at or below a predetermined maximum pressure, and (ii) controlling the rate of increase in vessel pressure within a predetermined pressure increase rate range, to remove a first portion of the water from the polyether polyol; then (b) controlling the rate of decrease in vessel pressure to normal atmospheric pressure within a first predetermined pressure decrease rate range; and then (c) maintaining the temperature of the polyether polyol at a temperature within a second predetermined distillation temperature range while (i) maintaining the pressure of the vessel below normal atmospheric pressure, and (ii) controlling the rate of decrease in vessel pressure below normal atmospheric pressure within a second predetermined pressure decrease rate range, which may be the same as or different from the first predetermined pressure decrease range.

Polyether polyols resulting from the processes of the present invention may be reacted with one or more isocyanates, as is known to those in the art, to provide improved polyurethane products including, but not limited to, coatings, adhesives, sealants, elastomers, foams, including flexible foams, and the like.

Suitable organic polyisocyanates for forming such poylurethanes include unmodified isocyanates, modified polyisocyanates, and isocyanate prepolymers. Such organic polyisocyanates include aliphatic, cycloaliphatic, araliphatic, aromatic, and heterocyclic polyisocyanates of the type described, for example, by W. Siefken in Justus Liebigs Annalen der Chemie, 562, pages 75 to 136. Examples of such isocyanates include those represented by the formula:

Q(NCO)n in which n is a number from 2-5, preferably 2-3, and Q is an aliphatic hydrocarbon group; a cycloaliphatic hydrocarbon group; an araliphatic hydrocarbon group; or an aromatic hydrocarbon group.

The non-limiting and non-exhaustive examples that follow are intended to further describe various non-limiting and non-exhaustive embodiments without restricting the scope of the embodiments described in this specification.

EXAMPLES

Examples 1-5

Neutralization and removal of water was conducted on the KOH catalyzed polyols listed in Table 1 using a system illustrated schematically in FIG. 1.

TABLE 1

| Example | Description |
|---|---|
| 1 | 6,000 molecular weight glycerin-based polyol with a hydroxyl number of 28, a functionality of 3, and an EO cap |
| 2 | 4,000 molecular weight propylene glycol-based polyol with a hydroxyl number of 28, a functionality of 2, and an EO cap |
| 3 | 6,000 molecular weight glycerin-based polyol with a hydroxyl number of 28, a functionality of 3, and an EO cap |

TABLE 1-continued

| Example | Description |
|---|---|
| 4 | 4,000 molecular weight propylene glycol-based polyol with a hydroxyl number of 28, a functionality of 2, and an EO cap |
| 5 | 4,550 molecular weight glycerin-based polyol with a hydroxyl number of 37, a functionality of 3, and an EO cap |

In each example, the crude, un-neutralized polyol was neutralized with 11% sulfuric acid to the theoretical % neutralization listed in Table 2.

TABLE 2

| Example | Theoretical % Neutralization | Vapor Flow Rate Maximum [lb/min (kg/min)] | Atmospheric Distillation Temperature Setpoint [° C.] | Vacuum Distillation Temperature Setpoint [° C.] |
|---|---|---|---|---|
| 1 | 106.1% | 500 (226.8) | 115 | 125 |
| 2 | 103% | 500 (226.8) | 115 | 125 |
| 3 | 105.8% | 500 (226.8) | 115 | 125 |
| 4 | 103.3% | 500 (226.8) | 115 | 125 |
| 5 | 108.4% | 500 (226.8) | 115 | 125 |

In the Comparative Examples, the vessel's vent control valve 40 was closed while heating the polyether polyol to the Atmospheric Distillation Temperature Setpoint listed in Table 2, and then, once this temperature was achieved, the vent control valve 40 was set to open as long as the vapor flow meter read under the Vapor Flow Rate Maximum identified in Table 2. However, the vapor flow meter was very inaccurate, so the vent control valve 40 was open most of the time, and poorly controlled. The vessel 20 was allowed to vent until it reached the Atmospheric Distillation Pressure End Point listed in Table 3. The temperature setpoint remained at the Atmospheric Distillation Temperature Setpoint listed in Table 2 throughout this venting. Then, vacuum was pulled on the vessel, and the temperature setpoint was raised to the Vacuum Distillation Temperature Set Point listed in Table 2. The vessel 20 vented to the Vacuum Distillation Pressure Endpoint listed in Table 3, still with the vent control valve 40 opening and closing based on the vapor flow meter, until the Vacuum Distillation Pressure Endpoint and the Vacuum Distillation Temperature Set Point, both listed in Table 3, were both satisfied.

In these Comparative Examples, with the rapid drops in pressure, the polyol foamed up during most of the distillation, threatening to overflow. This was seen by the erratic behavior of the liquid level.

In the Inventive Examples, the neutralized polyol was heated to the Atmospheric Distillation Temperature Setpoint in Table 2 to begin the distillation. In these Inventive Examples, the vent control valve 40 was set to partially open and close based on the vessel 20 pressure in order to allow the pressure to ramp up without exceeding the Preset Pressure Ramp Up Rate listed in Table 3 without exceeding the Atmospheric Distillation Pressure Maximum listed in Table 3. Then, once the temperature reached the Atmospheric Distillation Temperature Setpoint listed in Table 2, the vent control valve 40 position was controlled based on the measured pressure of vessel 20. The position of vent control valve 40 allowed the water vapor to vent off slowly, while following a preset pressure decrease profile that is described by Table 3. In this profile, the vessel 20 pressure decrease target rate was the Atmospheric Distillation Ramp Down Rate 1 listed in Table 3 until the Atmospheric Distillation Pressure Switch 1 pressure listed in Table 3 was reached. Then, the vessel 20 pressure decrease target rate was adjusted to the Atmospheric Distillation Ramp Down Rate 2 listed in Table 3 until the Atmospheric Distillation Pressure Switch 2 pressure listed in Table 3 was reached. Finally, the vessel 20 pressure decrease target rate was adjusted to the Atmospheric Distillation Ramp Down Rate 3 listed in Table 3 until the Atmospheric Distillation Pressure End Point listed in Table 3 was reached. The temperature setpoint remained at the Atmospheric Distillation Temperature Setpoint listed in Table 2 throughout this venting.

With the slow and controlled decrease of pressure in the Inventive Examples, the polyol level was much more controlled throughout the distillation, and foam-up was very mild. With the foam level controlled at a much lower point within the vessel, the risk of foam escaping out into the downstream equipment and wastewater was significantly reduced.

Figure 2A:
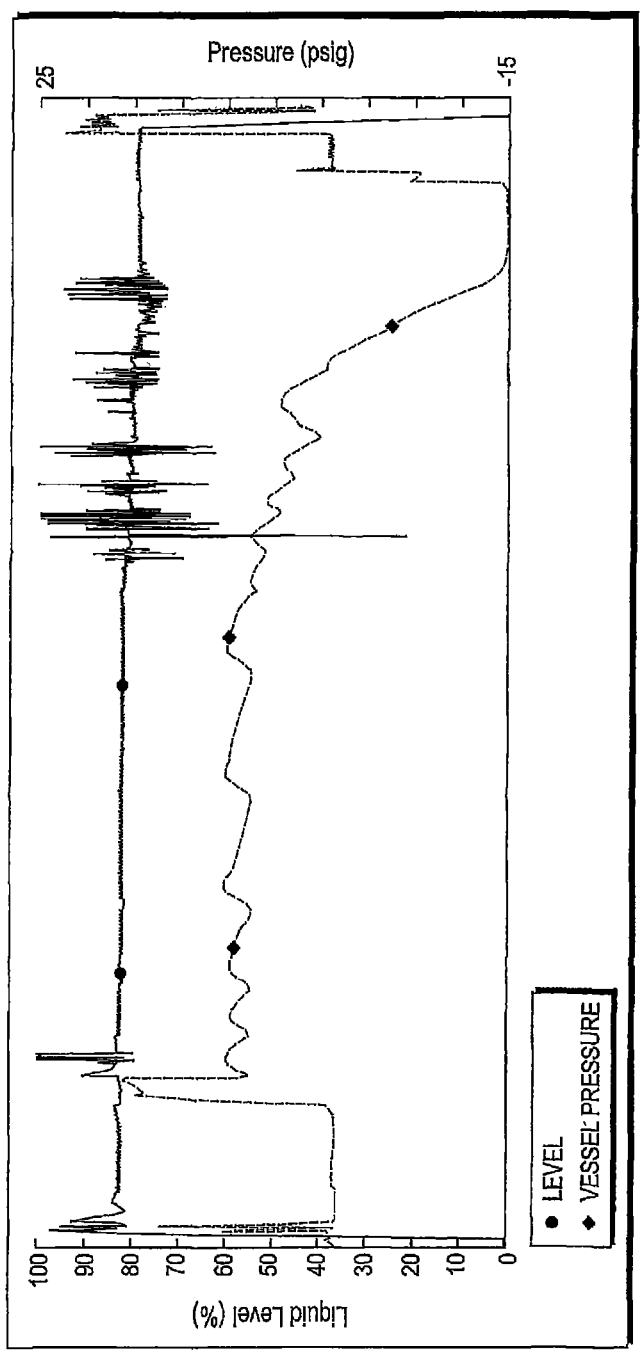
FIGS. 2A-2J are vessel pressure and vessel liquid level profiles during the distillation processes of the Comparative Examples and Inventive Examples.

FIG. 2A illustrates the vessel pressure and vessel liquid level profile during the distillation process of the Comparative Example using the polyol of Example 1. As is apparent, the pressure fluctuated with many quick drops that coincided

TABLE 3

ATMOSPHERIC DISTILLATION RAMPS

| Example | Preset Pressure Ramp Up Rate [psi/sec (mbar/sec)] | Atmospheric Distillation Pressure Maximum [psig (bar g)] | Atmospheric Distillation Ramp Down Rate 1 [psi/sec (mbar/sec)] | Atmospheric Distillation Pressure Switch 1 [psig (bar g)] | Atmospheric Distillation Ramp Down Rate 2 [psi/sec (mbar/sec)] | Atmospheric Distillation Pressure Switch 2 [psig (bar g)] | Atmospheric Distillation Ramp Down Rate 3 [psi/sec (mbar/sec)] | Atmospheric Distillation Pressure End Point [psig (bar g)] |
|---|---|---|---|---|---|---|---|---|
| 1 | 0.005 (0.34) | 10 (0.69) | 0.0004 (0.028) | 5.5 (0.38) | 0.00022 (0.015) | 2.0 (0.14) | 0.00033 (0.023) | 0.5 (0.034) |
| 2 | 0.005 (0.34) | 9.3 (0.64) | 0.0008 (0.055) | 5.5 (0.38) | 0.0006 (0.041) | 2.0 (0.14) | 0.0006 (0.041) | 0.5 (0.034) |
| 3 | 0.005 (0.34) | 6.1 (0.42) | 0.0006 (0.041) | 4.3 (0.30) | 0.00021 (0.014) | 2.0 (0.14) | 0.00021 (0.017) | 0.5 (0.034) |
| 4 | 0.005 (0.34) | 4.7 | 0.0005 (0.034) | 3.4 (0.23) | 0.0005 (0.034) | 1.5 (0.10) | 0.0006 (0.041) | 0.5 (0.034) |

In the Inventive Examples, once the Atmospheric Distillation Pressure End Point listed in Table 3 was reached, vacuum was pulled on the vessel 20 which continued until the Vacuum Distillation Pressure Endpoint listed in Table 4 was reached. After the commencement of vacuum, the polyol was heated to the Vacuum Distillation Temperature Setpoint listed in Table 2. Again, the vent control valve 40 position was controlled based on the measured pressure of vessel 20 as programmed, following a preset pressure decrease profile as water vapor was vented off. In this profile, the target rate of decrease of the pressure of vessel 20 was the Vacuum Distillation Ramp Down Rate 1 listed in Table 4 until Vacuum Distillation Pressure Switch 1 pressure listed in Table 4 was reached. Then, the pressure decrease target rate of vessel 20 was adjusted to the Vacuum Distillation Ramp Down Rate 2 listed in Table 4 until the Vacuum Distillation Pressure Switch 2 pressure listed in Table 4 was reached. Finally, the target pressure decrease rate of vessel 20 was adjusted to the Vacuum Distillation Ramp Down Rate 3 listed in Table 4 until the Vacuum Distillation Pressure End Point pressure listed in Table 4 was reached. The temperature setpoint remained at the Vacuum Distillation Temperature Setpoint listed in Table 2 throughout this venting.

with spikes in the liquid level, indicating foam up, in this case reaching to top of the vessel (100% level).

Figure 2B:
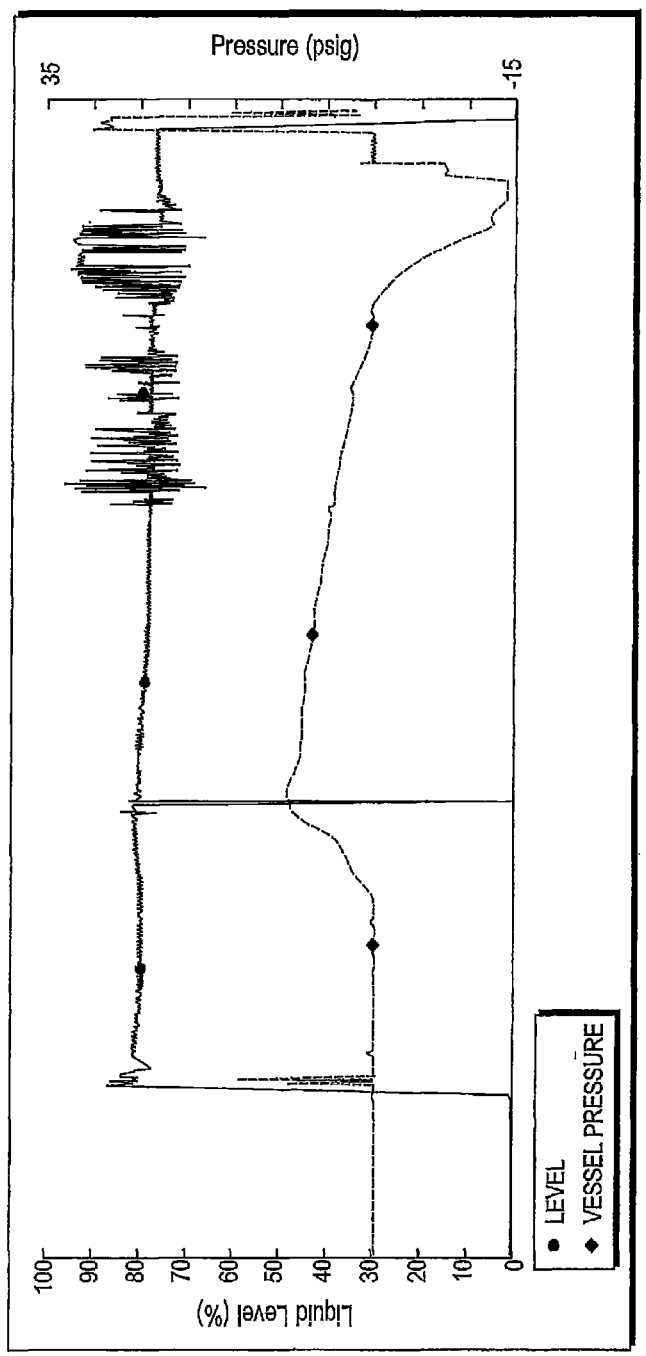

FIG. 2B illustrates the vessel pressure and vessel liquid level profile during the inventive distillation process using the polyol of Example 1. As is apparent, the pressure decreased at a much more controlled pace relative to the profile of FIG. 2A, without as many fluctuations. The liquid level also had less extreme spikes, staying below 100%.

Figure 2C:
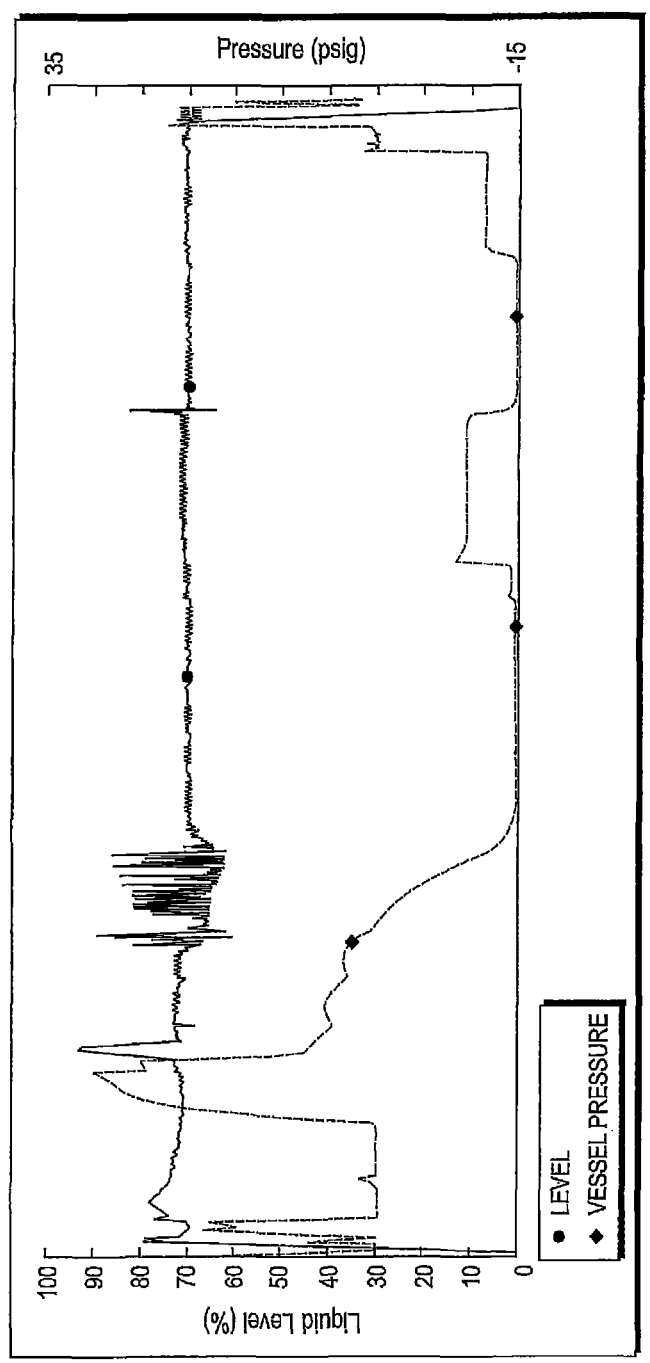

FIG. 2C illustrates the vessel pressure and vessel liquid level profile during the distillation process of the Comparative Example using the polyol of Example 2. As is apparent, the pressure dropped very rapidly. The liquid level spiked into the high-80's and 90% range.

Figure 2D:
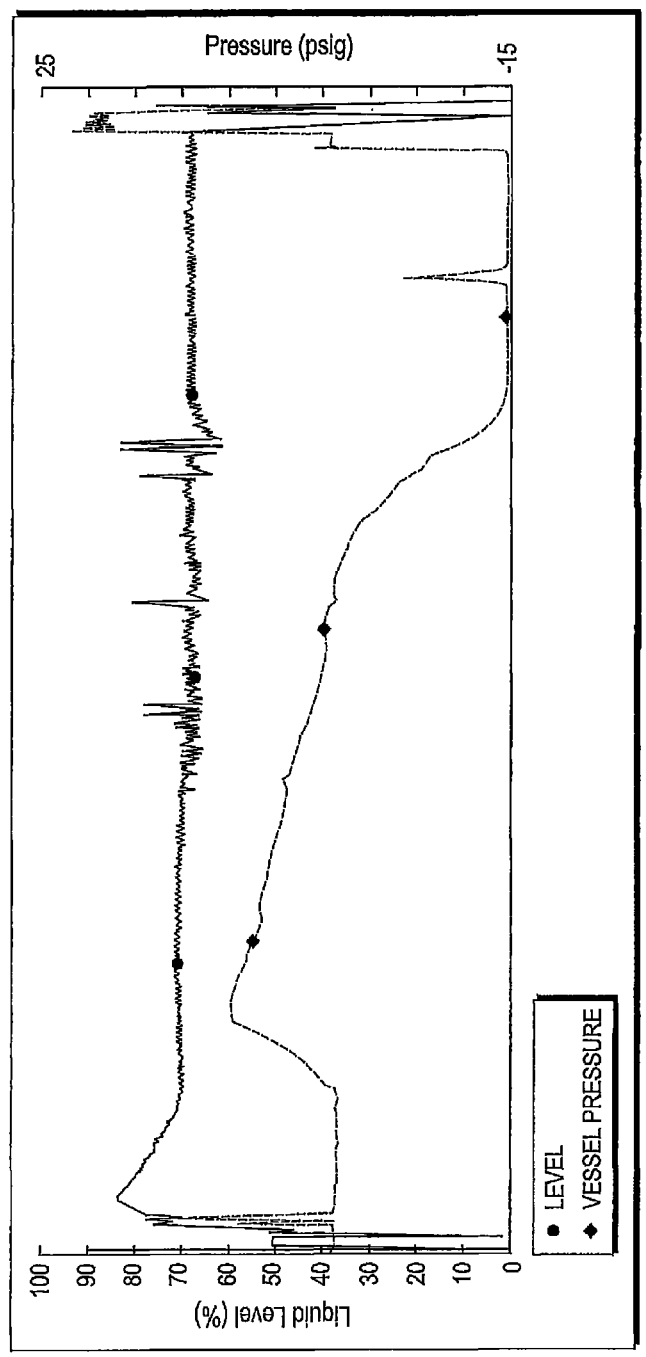

FIG. 2D illustrates the vessel pressure and vessel liquid level profile during the inventive distillation process using the polyol of Example 2. As is apparent, the pressure decrease was slow and controlled relative to the profile of FIG. 2C. The liquid level spikes were also fewer and only reached into the low-80's % range.

Figure 2E:
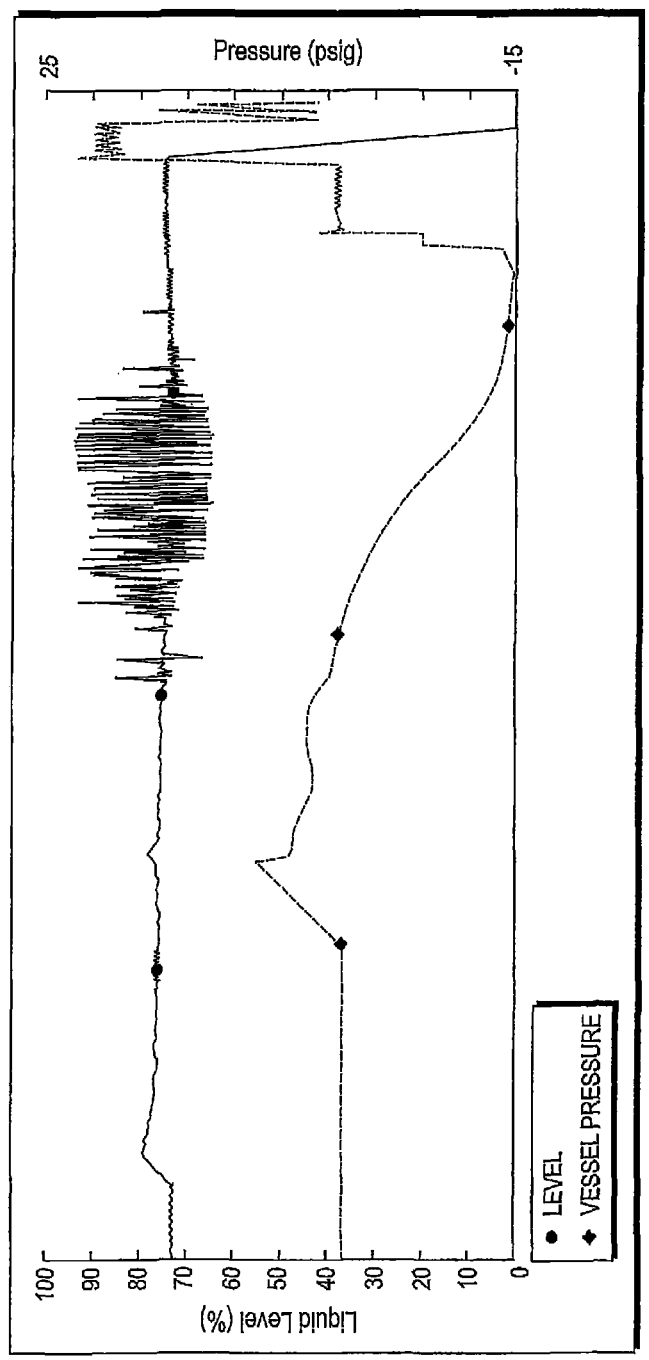

FIG. 2E illustrates the vessel pressure and vessel liquid level profile during the distillation process of the Comparative Example using the polyol of Example 3. As is apparent, the pressure decrease was rapid. There were liquid level spikes into the 80's and low 90's % range.

TABLE 4

VACUUM DISTILLATION RAMPS

| Example | Vacuum Distillation Starting Pressure [psig (bar g)] | Vacuum Distillation Ramp Down Rate 1 [psi/sec (mbar/sec)] | Vacuum Distillation Pressure Switch 1 [psig (bar g)] | Vacuum Distillation Ramp Down Rate 2 [psi/sec (mbar/sec)] | Vacuum distillation Pressure Switch 2 [psig (bar g)] | Vacuum Distillation Ramp Down Rate 3 [psi/sec (mbar/sec)] | Vacuum Distillation Pressure End Point [psig (bar g)] |
|---|---|---|---|---|---|---|---|
| 1 | 0.5 (0.034) | 0.0008 (0.055) | −5.0 (−0.34) | 0.001 (0.068) | −9.0 (−0.62) | 0.005 (0.034) | −12.5 (−0.86) |
| 2 | 0.5 (0.034) | 0.0009 (0.062) | −5.0 (−0.34) | 0.0015 (0.10) | −9.0 (−0.62) | 0.006 (0.41) | −12.7 (−0.88) |
| 3 | 0.5 (0.034) | 0.0008 (0.055) | −4.7 (−0.32) | 0.001 (0.069) | −7.5 (−0.52) | 0.002 (0.14) | −12.0 (−0.83) |
| 4 | 0.5 (0.034) | 0.0008 (0.055) | −5.0 (−0.34) | 0.001 (0.069) | −9.0 (−0.62) | 0.006 (0.41) | −11.7 (−0.81) |
| 5 | 0.5 (0.034) | 0.008 (0.55) | −10.1 (0.70) | 0.006 (0.41) | −13.0 (0.90) | 0.0008 (0.055) | −13.7 (−0.94) |

Figure 2F:
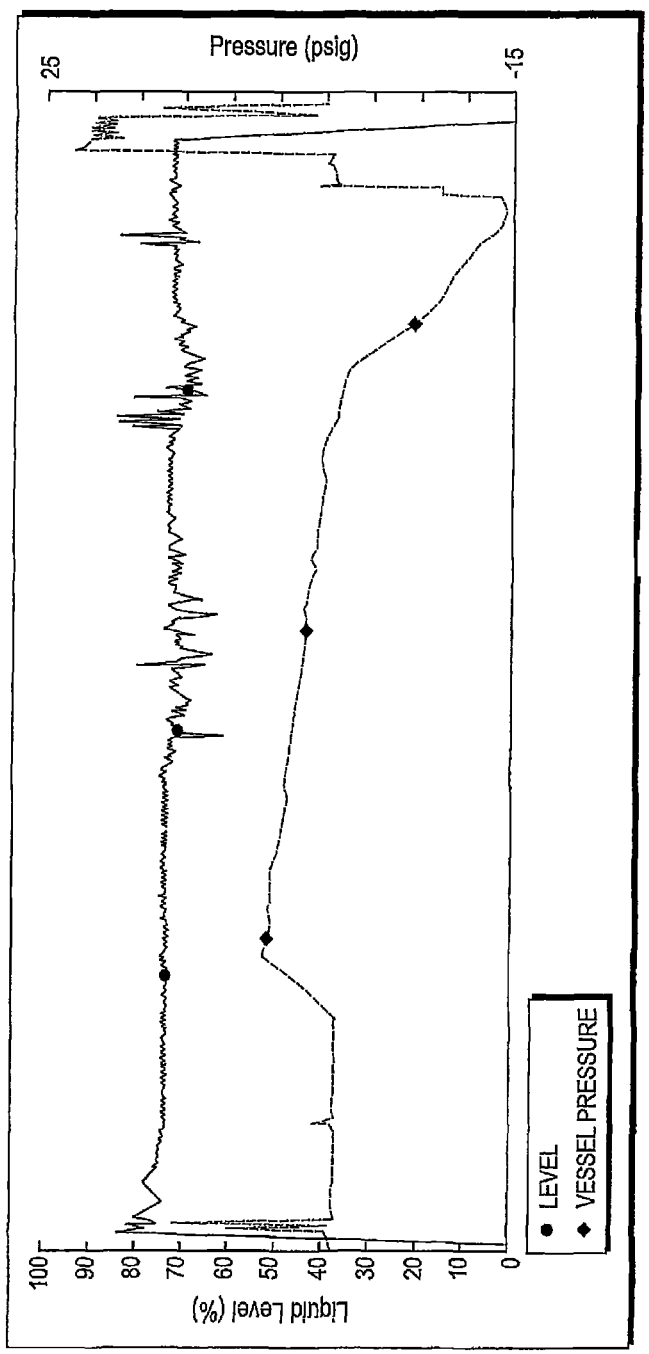

FIG. 2F illustrates the vessel pressure and vessel liquid level profile during the inventive distillation process using the polyol of Example 3. As is apparent, the pressure decrease was much slower and more controlled than the profile of FIG. 2E. The liquid level spikes were fewer and reached only into the low-80's % range.

Figure 2G:
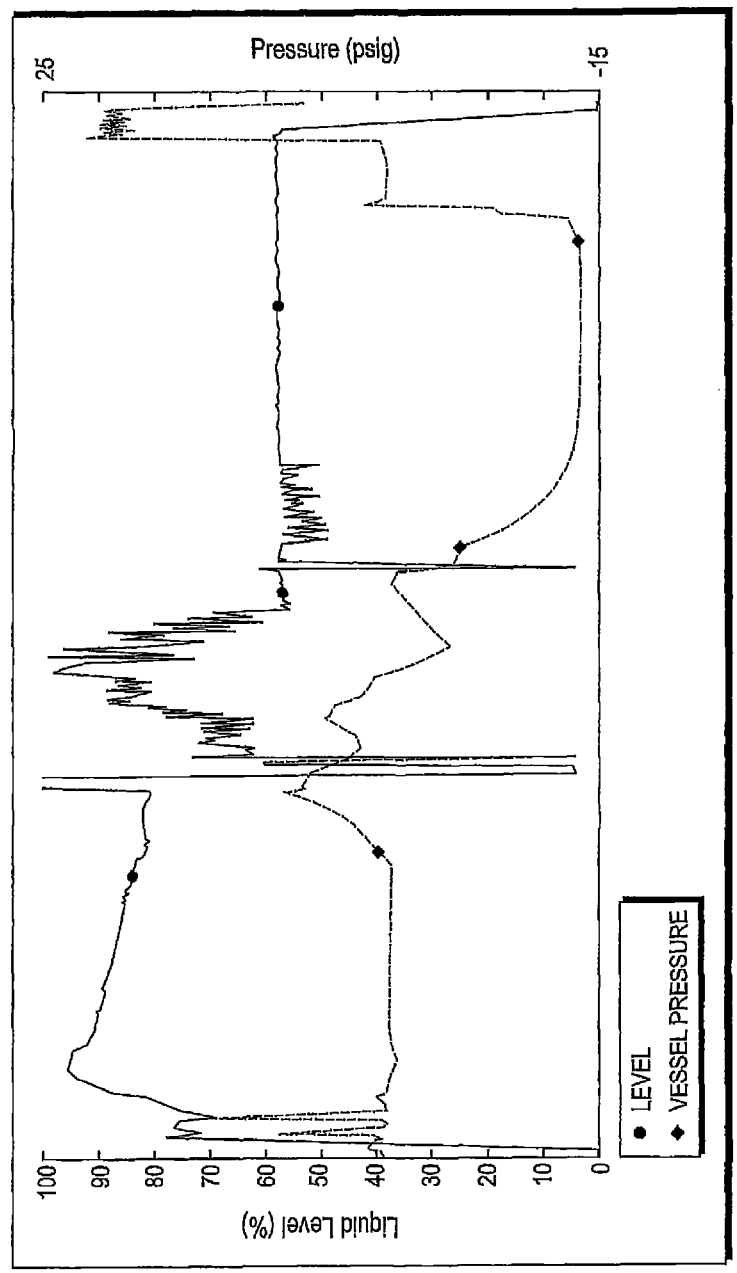

FIG. 2G illustrates the vessel pressure and vessel liquid level profile during the distillation process of the Comparative Example using the polyol of Example 4. As is apparent, the pressure decrease was rapid and up and down. The liquid level was erratic and hit 100% level a few times.

Figure 2H:
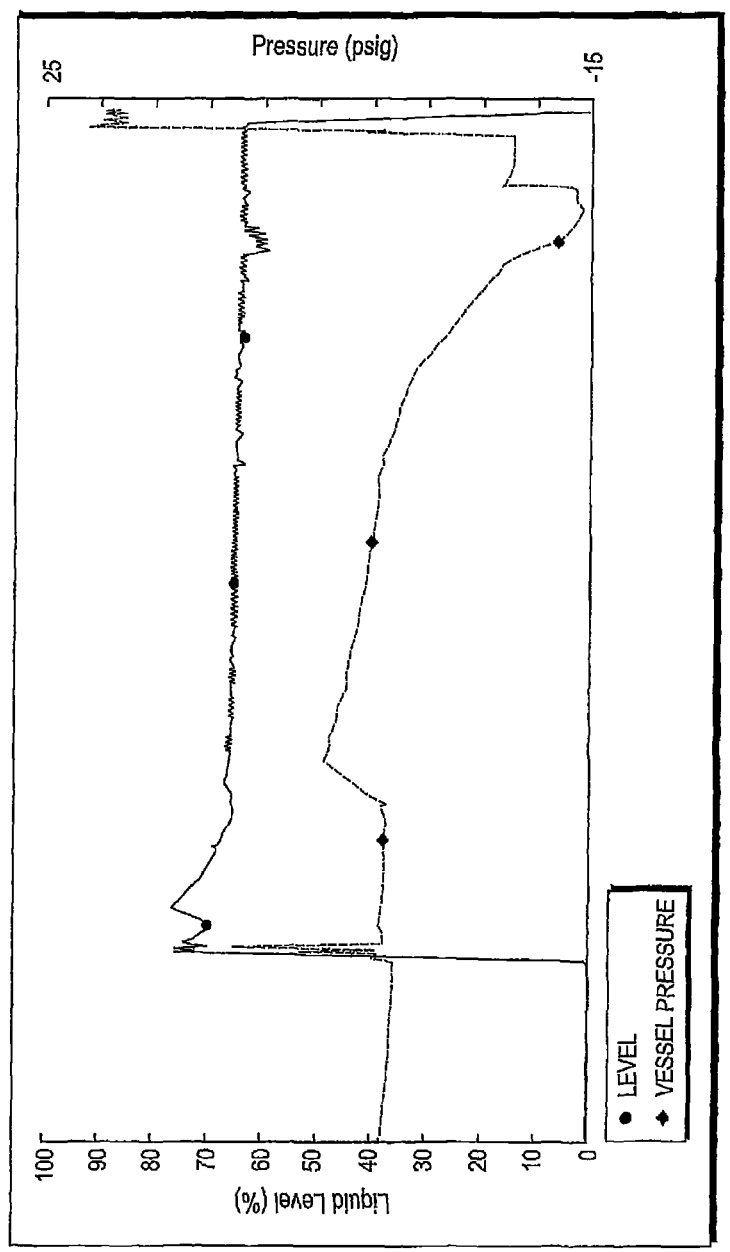

FIG. 2H illustrates the vessel pressure and vessel liquid level profile during the inventive distillation process using the polyol of Example 4. As is apparent, the pressure decrease was much slower and more controlled than the profile of FIG. 2G. The liquid level was relatively smooth with only one small spike at the beginning.

Figure 2I:
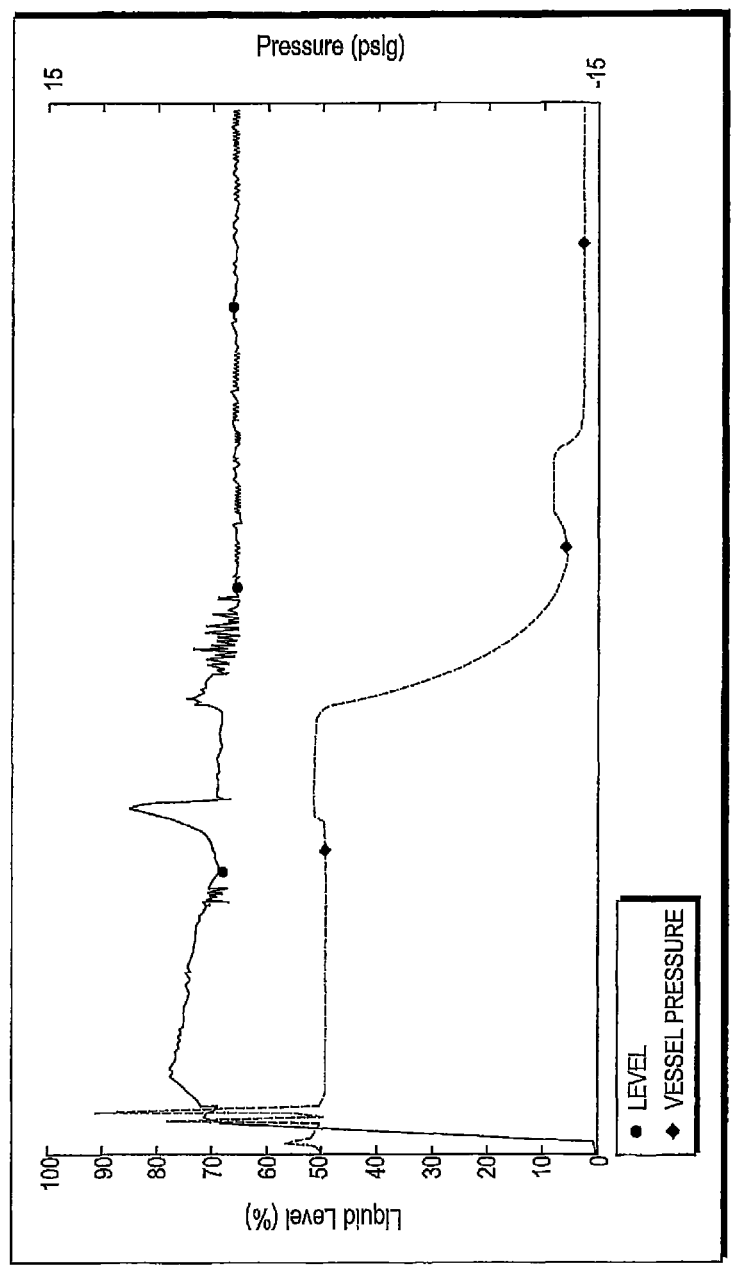

FIG. 2I illustrates the vessel pressure and vessel liquid level profile during the distillation process of the Comparative Example using the polyol of Example 5. As is apparent, the pressure decrease was rapid. A few small spikes in liquid level occurred.

Figure 2J:
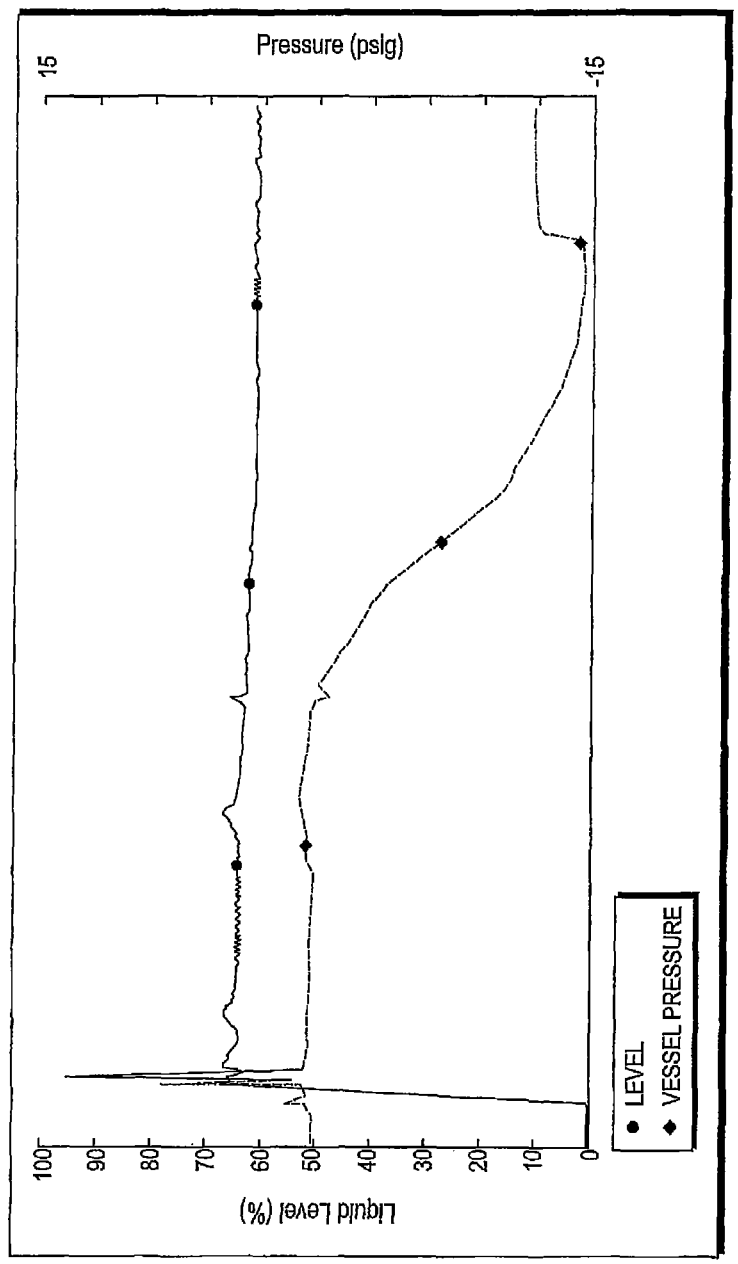

FIG. 2J illustrates the vessel pressure and vessel liquid level profile during the inventive distillation process using the polyol of Example 5. As is apparent, the pressure decrease was slower relative to the profile of FIG. 2I. The liquid level was smooth with no spikes.

What is claimed is:

1. A process for removing water from a polyether polyol in a vessel by batch distillation, comprising:
    (a) heating the polyether polyol to a temperature within a first predetermined distillation temperature range while (i) maintaining the pressure of the vessel at or above normal atmospheric pressure and at or below a predetermined maximum pressure, and (ii) controlling the rate of increase in vessel pressure within a predetermined pressure increase rate range, to remove a first portion of the water from the polyether polyol; and then
    (b) controlling the rate of decrease in vessel pressure within a predetermined pressure decrease rate range, to remove a second portion of the water from the polyether polyol, by at least one of (b)(i) and (b)(ii), wherein:
according to (b)(i)
    (1) a target rate of decrease in vessel pressure to normal atmospheric pressure is "x" to a first pressure set point above normal atmospheric pressure;
    (2) a target rate of decrease in vessel pressure to normal atmospheric pressure is less than "x" to a second pressure set point that is a pressure lower than the first pressure set point above normal atmospheric pressure and above normal atmospheric pressure, and
    (3) a target rate of decrease in vessel pressure to normal atmospheric pressure is greater than "x" to a third pressure set point that is a pressure lower than the second pressure set point above normal atmospheric pressure and at or above normal atmospheric pressure, and
according to (b)(ii)
    (1) a target rate of decrease in vessel pressure below normal atmospheric pressure is "y" to a first pressure set point below normal atmospheric pressure;
    (2) a target rate of decrease in vessel pressure below normal atmospheric pressure is greater than "y" to a second pressure set point that is a pressure lower than the first pressure set point below normal atmospheric pressure; and
    (3) a target rate of decrease in vessel pressure below normal atmospheric pressure is less than "y" to a third pressure set point that is a pressure lower than the second pressure set point below normal atmospheric pressure.

2. The process of claim 1, wherein the polyether polyol has a number average molecular weight of 700 to 12,000 gram/mole, a hydroxyl number of 28 to 150 mg KOH/gram determined according to ASTM D6342-12, and wherein the polyether is an ethylene oxide capped polyether polyol having terminal primary hydroxyl groups.

3. The process of claim 1, wherein the first predetermined distillation temperature range is 100° C. to 140° C. and the predetermined maximum pressure is at least normal atmospheric pressure up to 2.02 atmosphere (29.7 lb/in$^2$).

4. The process of claim 1, wherein the rate of increase in vessel pressure is controlled within a predetermined pressure increase rate range by adjusting the position of a vent control valve disposed in a vent line of the vessel upstream of further equipment.

5. The process of claim 1, wherein a target rate of increase in vessel pressure during step (a) is 0.01 to 1 lb/in$^2$ per minute (0.00068 to 0.068 atmosphere per minute) and wherein step (b) comprises controlling the rate of decrease in vessel pressure to normal atmospheric pressure at a rate within the range of 0.01 to 1 lb/in$^2$ per minute (0.00068 to 0.068 atmosphere per minute).

6. The process of claim 1, wherein:
    (i) step (b) comprises maintaining the temperature of the polyether polyol at a temperature within a second predetermined distillation temperature range while (i) maintaining the pressure of the vessel below normal atmospheric pressure, and (ii) controlling the rate of decrease in vessel pressure below normal atmospheric pressure;
    (ii) the temperature of the polyether polyol within the second predetermined distillation temperature range is at least 5° C. higher than the temperature of the polyether polyol within the first predetermined distillation temperature range; and
    (iii) a target rate of decrease in vessel pressure below normal atmospheric pressure is 0.1 to 0.3 lb/in$^2$ per minute (0.0068 to 0.020 atmosphere per minute).

7. The process of claim 6, wherein the rate of pressure decrease below normal atmospheric pressure is controlled by adjusting the position of a vent control valve disposed in a vent line of the vessel upstream of further equipment.

8. The process of claim 1, wherein step (b) comprises steps (b)(i) and (b)(ii).

9. The process of claim 8, wherein:
    "x" is a value within the range of 0.1 to 0.3 lb/in$^2$ per minute (0.0068 to 0.020 atmosphere per minute);
    the target rate of decrease in vessel pressure to normal atmospheric pressure in step (b)(i)(2) is less than 50% of "x"; and
    the target rate of decrease in vessel pressure to normal atmospheric pressure in step (b)(i)(3) is at least 120% of "x".

10. The process of claim 8, wherein:
    "y" is a value within the range of 0.1 to 0.3 lb/in$^2$ per minute (0.0068 to 0.020 atmosphere per minute);
    the target rate of decrease in vessel pressure below normal atmospheric pressure in step (b)(ii)(2) is at least 120% of "y"; and
    the target rate of decrease in vessel pressure below normal atmospheric pressure in step (b)(ii)(3) is less than 80% of "y".

11. A process for removing water from a polyether polyol in a vessel by batch distillation, comprising:
  (a) heating the polyether polyol to a temperature within a first predetermined distillation temperature range while (i) maintaining the pressure of the vessel at or above normal atmospheric pressure and at or below a predetermined maximum pressure, and (ii) controlling the rate of increase in vessel pressure within a predetermined pressure increase rate range, to remove a first portion of the water from the polyether polyol; then
  (b) controlling the rate of decrease in vessel pressure to normal atmospheric pressure within a first predetermined pressure decrease rate range; and then
  (c) maintaining the temperature of the polyether polyol within a second predetermined distillation temperature range while maintaining the pressure of the vessel below normal atmospheric pressure, and controlling the rate of decrease in vessel pressure below normal atmospheric pressure within a second predetermined pressure decrease rate range that is the same as or different from the first predetermined pressure decrease range, and wherein the process comprises at least one of steps (b)(i) and (c)(i), wherein
according to step (b)(i):
  (1) a target rate of decrease in vessel pressure to normal atmospheric pressure is "x" to a first pressure set point above normal atmospheric pressure;
  (2) a target rate of decrease in vessel pressure to normal atmospheric pressure is less than "x" to a second pressure set point that is a pressure lower than the first pressure set point above normal atmospheric pressure and above normal atmospheric pressure, and
  (3) a target rate of decrease in vessel pressure to normal atmospheric pressure is greater than "x" to a third pressure set point that is a pressure lower than the second pressure set point above normal atmospheric pressure and at or above normal atmospheric pressure, and according to in step (c)(i):
  (1) a target rate of decrease in vessel pressure below normal atmospheric pressure is "y" to a first pressure set point below normal atmospheric pressure;
  (2) a target rate of decrease in vessel pressure below normal atmospheric pressure is greater than "y" to a second pressure set point that is a pressure lower than the first pressure set point below normal atmospheric pressure; and
  (3) a target rate of decrease in vessel pressure below normal atmospheric pressure is less than "y" to a third pressure set point that is a pressure lower than the second pressure set point below normal atmospheric pressure.

12. The process of claim 11, wherein the polyether polyol has a number average molecular weight of 700 to 12,000 gram/mole, a hydroxyl number of 28 to 150 mg KOH/gram determined according to ASTM D6342-12, and wherein the polyether is an ethylene oxide capped polyether polyol having terminal primary hydroxyl groups.

13. The process of claim 11, wherein the first predetermined distillation temperature range is 100° C. to 140° C. and the predetermined maximum pressure is at least normal atmospheric pressure up to 2.02 atmosphere (29.7 lb/in$^2$).

14. The process of claim 11, wherein the rate of increase in vessel pressure is controlled within a predetermined pressure increase rate range by adjusting the position of a vent control valve disposed in a vent line of the vessel upstream of further equipment.

15. The process of claim 11, wherein a target rate of increase in vessel pressure during step (a) is 0.01 to 1 lb/in$^2$ per minute (0.00068 to 0.068 atmosphere per minute) and step (b) comprises controlling the rate of decrease in vessel pressure to normal atmospheric pressure to a rate within 0.01 to 1 lb/in$^2$ per minute (0.00068 to 0.068 atmosphere per minute).

16. The process of claim 11, wherein the temperature of the polyether polyol within the second predetermined distillation temperature range is at least 5° C. higher than the temperature of the polyether polyol within the first predetermined distillation temperature range.

17. The process of claim 11, wherein the rate of pressure decrease below normal atmospheric pressure is controlled by adjusting the position of a vent control valve disposed in a vent line of the vessel upstream of further equipment.

18. The process of claim 11, wherein a target rate of decrease in vessel pressure below normal atmospheric pressure is 0.1 to 0.3 lb/in$^2$ per minute (0.0068 to 0.020 atmosphere per minute).

19. The process of claim 11, wherein the process comprises steps (b)(i) and (c)(i).

20. The process of claim 19, wherein:
  "x" is a value within the range of 0.1 to 0.3 lb/in$^2$ per minute (0.0068 to 0.020 atmosphere per minute);
  the target rate of decrease in vessel pressure to normal atmospheric pressure in step (b)(i)(2) is less than 50% of "x"; and
  the target rate of decrease in vessel pressure to normal atmospheric pressure in step (b)(i)(3) is at least 120% of "x".

21. The process of claim 19, wherein:
  "y" is a value within the range of 0.1 to 0.3 lb/in$^2$ per minute (0.0068 to 0.020 atmosphere per minute);
  the target rate of decrease in vessel pressure below normal atmospheric pressure in step (c)(i)(2) is at least 120% of "y"; and
  the target rate of decrease in vessel pressure below normal atmospheric pressure in step (c)(i)(3) is less than 80% of "y".

* * * * *